July 14, 1964 H. L. NEILSEN 3,141,072

SUPPORTING DEVICE FOR TELEPHONE INSTRUMENT

Filed Nov. 6, 1962 3 Sheets-Sheet 1

INVENTOR:
HILDAUR L. NEILSEN
BY Robert Henderson
ATTORNEY

SUPPORTING DEVICE FOR TELEPHONE INSTRUMENT

Filed Nov. 6, 1962

INVENTOR:
HILDAUR L. NEILSEN
BY Robert Henderson
ATTORNEY

July 14, 1964 H. L. NEILSEN 3,141,072

SUPPORTING DEVICE FOR TELEPHONE INSTRUMENT

Filed Nov. 6, 1962 3 Sheets-Sheet 3

INVENTOR:
HILDAUR L. NEILSEN
BY
Robert Henderson
ATTORNEY

United States Patent Office 3,141,072
Patented July 14, 1964

3,141,072

SUPPORTING DEVICE FOR TELEPHONE INSTRUMENT

Hildaur L. Neilsen, 2 Juniper St., Metuchen, N.J.

Filed Nov. 6, 1962, Ser. No. 235,736
16 Claims. (Cl. 179—157)

This invention relates to a supporting device, applicable to a telephone instrument and having the facility of supporting the instrument upon a user's shoulder with a substantial degree of stability, meanwhile leaving both hands of the user free for other purposes.

More particularly, this invention is directed to improved means for mounting the supporting device intimately upon such an instrument and to improved means by which certain portions of the device are enabled to be pivoted way from the instrument to condition it to serve its purpose of supporting the instrument on the user's shoulder.

The just-indicated objectives are accomplished by this invention of which a preferred embodiment is shown, for illustrative purposes, in the accompanying drawings without, however, limiting the invention to that particular embodiment.

Figure 1:
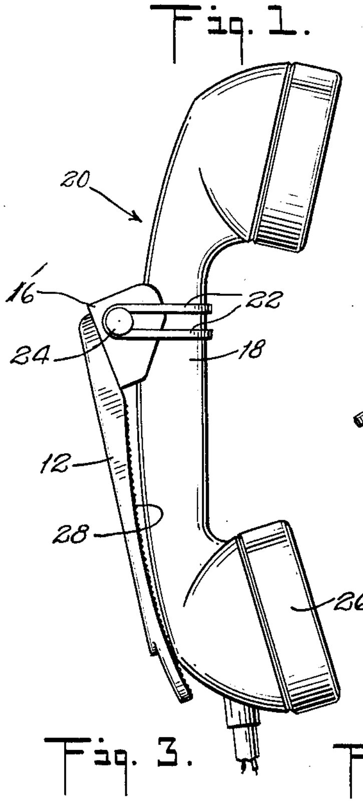
FIGURE 1 is a side elevational view of a telephone instrument with a supporting device, according to this invention, attached to the instrument in non-usable relation thereto (hereinafter referred to for convenience as the device's "dormant condition").
Figure 5:
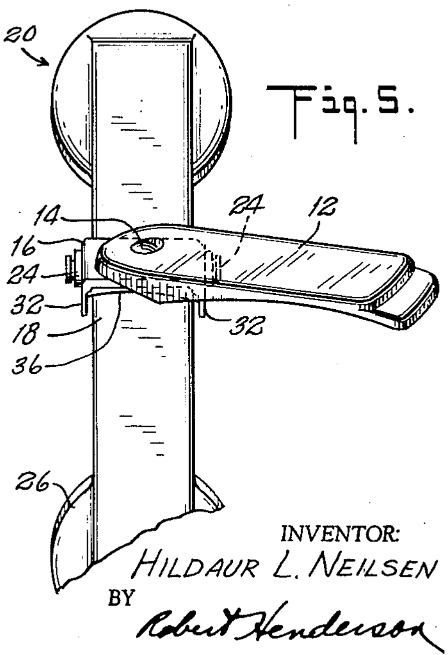
FIG. 5 is an elevational view, generally similar to FIG. 4, but showing said arm as after having been pivoted laterally of the telephone instrument from its said first extended position to a final or supporting position in which it may function with said instrument to perform the indicated supporting function.

Before describing details of this invention, it should be noted that prior efforts of others to provide a suitable supporting device for such a telephone instrument have involved the use of an arm which dormantly lies close to the instrument somewhat as shown in FIG. 1 and which, in final or usable supporting position, extends obliquely from the instrument somewhat as shown in FIG. 5. Also, without showing the instrument and supporting device upon a user's shoulder, it should be understood that, when they are in their relationship as illustrated in FIG. 5, they do, in fact, rest upon the user's shoulder in a substantially stable condition.

The supporting device of this invention, as illustrated in the drawings, comprises an arm 12, pivoted by pivot pin 14 to a mounting element 16 which is yieldably fastened to a neck portion 18 of a telephone instrument 20 by a band 22, of any suitable, elastic material such as relatively soft rubber or such as a coil spring, extending about the inner side of said neck portion and looped onto integral lugs 24 formed on opposite sides of the mounting element.

The arm 12 advantageously extends toward and overlies the transmitter 26 of the telephone instrument and its underside is preferably given a suitable high-friction covering to oppose sliding thereof in relation to a shoulder portion of a garment worn by the user. This high-friction covering may comprise a layer or coating 28 of inherently high-friction material such as, e.g., soft rubber, which material may have its exposed surface suitably knurled or otherwise roughened to increase its frictional effect. The band 22 may be continuous or endless, as illustrated, or it may be a non-continuous length of elastic or spring material provided with end loops for engagement with the lugs 24.

Conditioning of the device for use involves two pivotal movements of the arm 12; first, from its dormant position (FIG. 1) to its first extended position, (FIG. 2), and, second, from its latter position to its final or supporting position (FIG. 5) to render the device ready for use for its support purpose.

Figure 2:
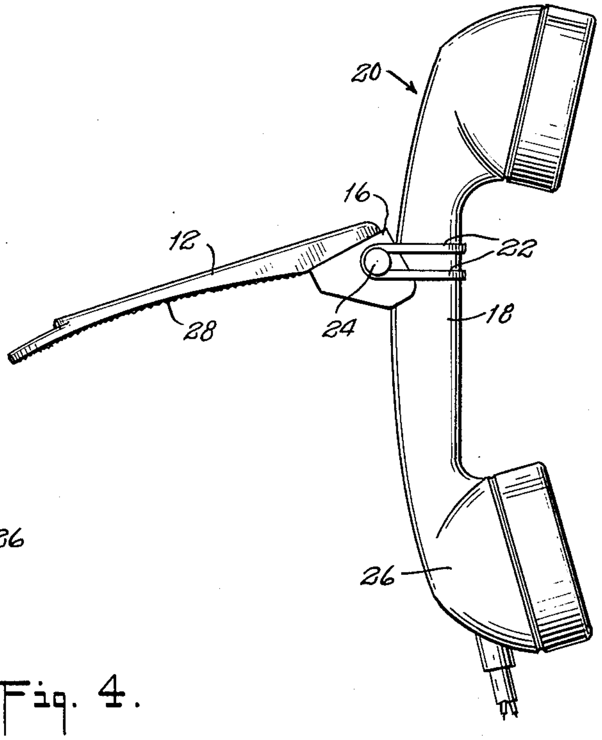
FIG. 2 is a view generally similar to FIG. 1, but with an arm of said device pivoted outwardly to a first extended position to which it is moved in conditioning the device for use.
Figure 3:
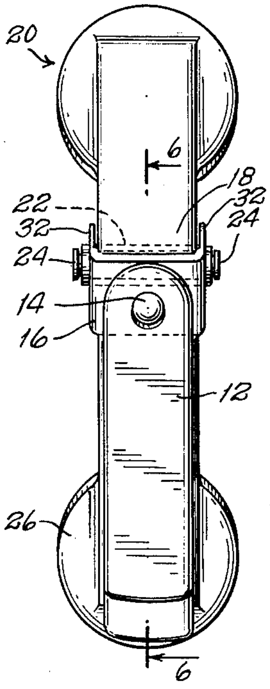
FIGS. 3 and 4 are elevational views, respectively, of the structures shown in FIGS. 1 and 2, as viewed from the left sides of said figures.
Figure 4:
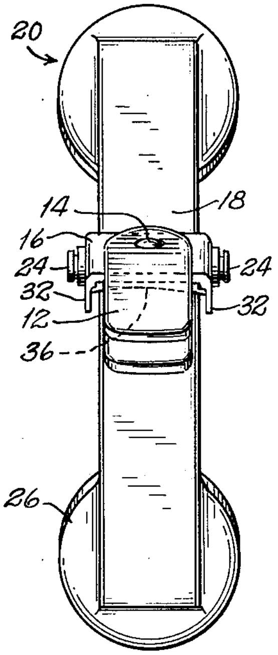

In said first movement of the arm from its FIG. 1 position to its FIG. 2 position, it is swung in a plane corresponding to the principal central plane of the telephone instrument; i.e., as seen in FIGS. 3 and 4, the arm is swung directly toward the viewer. This first swinging action of the arm depends upon a cam coaction of the mounting element 16 with the neck of the telephone instrument.

To afford such cam action, the mounting element 16 is specially formed. Said element comprises a transverse top plate 30 having integral side wings 32 which extend downwardly close to opposite sides of the neck 18. At an intermediate point thereof, the element 16 is formed with a camming web 34 between and integral with the wings 32, serving not only a camming purpose hereinafter described but also the purpose of bracing the wings 32 against possible deflection.

The outer or free edge 36 of the web 34 is slightly curved (FIG. 4) to conform substantially to the curvature of the adjacent surface of the telephone instrument's neck 18 with which said web exerts a sliding camming action.

Figures 6, 7, 8, 9, 10:
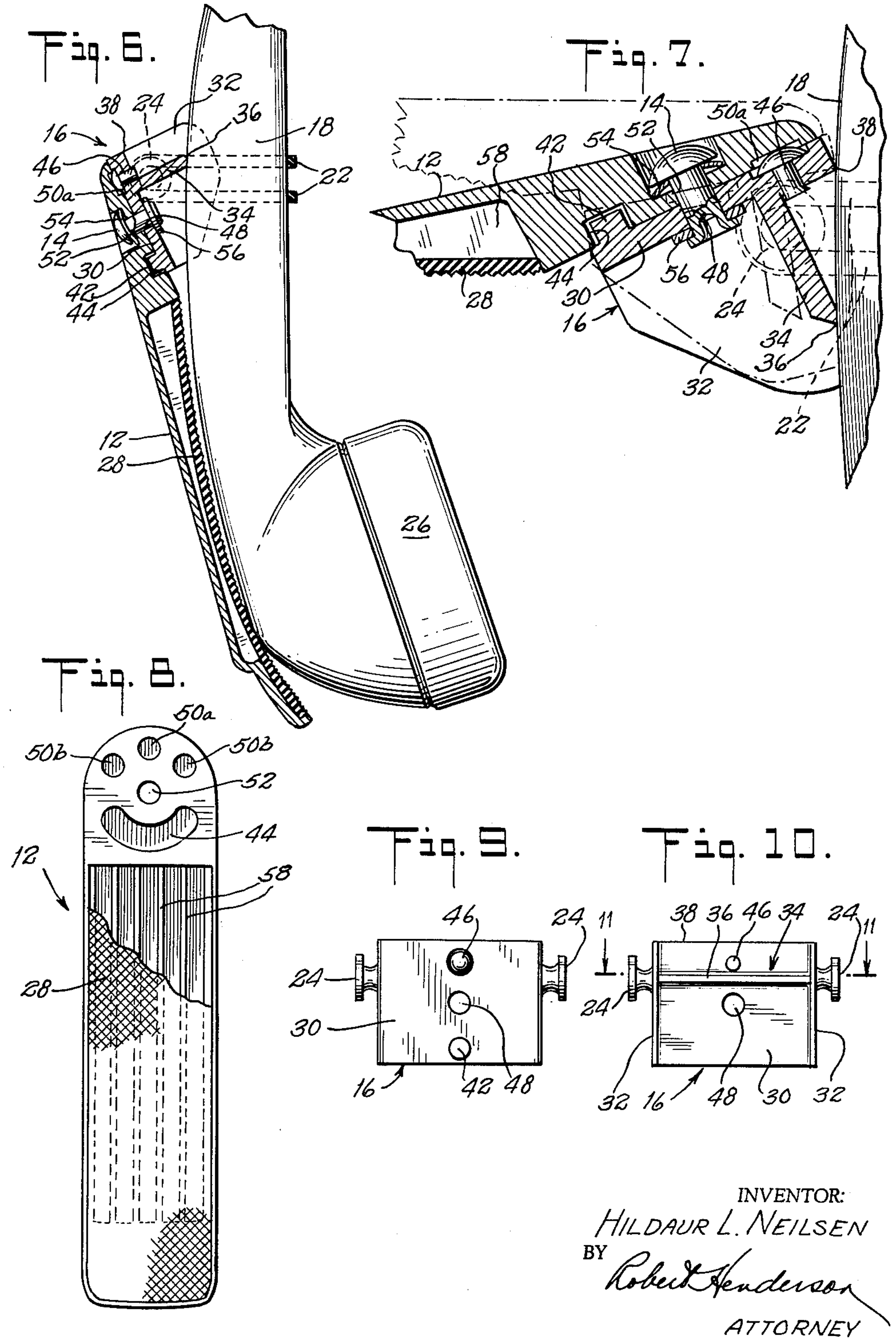
FIG. 6 is an enlarged view of the lower portion of FIG. 1, the supporting device being shown in longitudinal section in a central plane corresponding substantially to the principal plane of the telephone instrument.
FIG. 7 is a more greatly enlarged fragmentary, sectional view at the same plane as in FIG. 6, showing details of the pivotal mounting of the device, and serving, by comparison with FIG. 6, to illustrate the manner in which pivoting occurs from dormant condition (FIGS. 1 and 3) to the first extended condition of said arm (FIGS. 2 and 4).
FIG. 8 is an elevational view of the underside of said arm, disassociated from other parts of the device.
FIGS. 9 and 10 are elevational views, respectively, of the top and of the bottom of a mounting element to which said arm is pivoted.

Referring to FIG. 6, it will be seen that the force of the elastic band 22, applied to the lugs 24, is effective between web edge 36 and the free end of the arm 12 to hold the latter in its dormant position lying intimately against the telephone instrument. When the user swings the arm 12 upwardly, away from said instrument, the edge 36 of the web 34 slides on the neck of the instrument from its FIG. 6 position to its FIG. 7 position, the elastic band, meanwhile, permitting the pivot point lugs 24 to move slightly away from and then pulling them back toward the telephone instrument.

It may be seen from FIG. 7 that, when the arm 12 is in its illustrated first extended position, the band 22 exerts a force on the lugs 24, directed toward the telephone instrument, at a point between web edge 36 and a back edge 38 of top plate 30 of the mounting element so that the just-stated characteristics, with the aid of the two side wings 32, serve to hold the mounting element 16 firmly against shifting relatively to the telephone instrument. It should be noted that the mounting element 16 remains in its last-indicated position during further pivoting of arm 12 and during actual use of the device.

The just-mentioned further pivoting of arm 12 is a movement of the latter, by the user, from its position of FIGS. 2 and 4 to its supporting position of FIG. 5. In connection with this pivotal movement, holding means are provided to hold the arm either in its first extended position of FIGS. 2 and 4, or to either of oblique supporting positions at either side of the telephone instrument. Said arm is shown extended rightwardly in FIG. 5, but it may similarly be swung to extend leftwardly so that the device may be used on either shoulder of the user. Limiting means also are provided to limit the extent of swing of arm 12 toward either side.

The mentioned limiting means comprise an integral stud 42 at the top of plate 30 of the mounting element, extending slidably within an arcuate channel 44 formed in the adjacent underside of the arm 12 in direct opposition to the path of arcuate movement of said stud relatively to the arm. The arm 12, of course, can swing laterally only to the extent of free movement of said stud within said channel.

The mentioned holding means comprise a detent which may be merely a raised, circular formation on the top of plate 30 of the mounting element, but preferably, as shown, is in the form of a domed head of a small stud or rivet 46 suitably fixed into said top plate at a distance from pivot hole 48 in the latter; said head protruding slightly above the surface of said plate.

To cooperate with said domed head, the under surface of the adjacent end of arm 12 is formed with plural similar pockets 50*a* and 50*b* arranged at an arcuate line spaced, center-to-center, from pivot hole 52 in said arm to the same extent as the spacing of detent 46 from pivot hole 48. Pocket 50*a* is located centrally on the arm 12 to cooperate with the detent in holding the arm in its non-laterally extended position as in FIGS. 3 and 4, while pockets 50*b* are located toward opposite sides of said arm to cooperate with the detent to hold the arm in a supporting position at either side of the telephone instrument.

If the arm 12 and/or the mounting element 16 is of slightly resilient material, such as some kinds of plastics or metals, that resiliency may enable the detent 46 to enter the pockets 50*a*, 50*b* and stay therein with adequate firmness, yet retract therefrom upon swinging of the arm 12, even though the pivot pin 14 is tightly swaged in place in the pivot holes 48 and 52. It is preferred, however, to avoid reliance upon the just-stated resiliency, but to provide a slightly yieldable interconnection of the arm 12 and the mounting element 16 by providing a suitable annular spring 54 directly underneath the head of the pivot pin, the inner end of the latter being swaged over an adjacent flat washer 56 in such manner as to leave flexing space for the spring underneath the head of the pivot pin. The spring 54 may be of undulating form or may be a finger spring or a "Belleville" type of spring, and its force, of course, should be effective in parallelism with the longitudinal axis of the pivot pin.

This device, for the most part, may be of suitable plastic material or light metal of relatively thin section where feasible. Thus, for example, the arm 12 may be quite thin but somewhat rigidified by providing reinforcing ribs 58 at its underside, these ribs being covered by the layer or coating 28 of frictional material.

Figure 11:
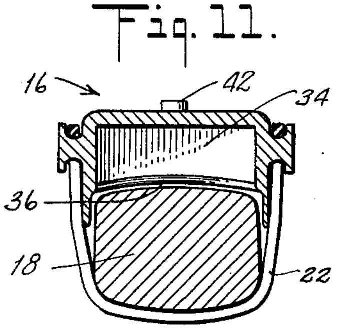
FIG. 11 is a cross-sectional view of said mounting element substantially on the line 11—11 of FIG. 10 showing its assembled relationship with a relatively modern type of telephone instrument; only the exterior shape of the latter, at said section, being shown.

This device has thus far been detailed as applied to a relatively modern type of telephone instrument having a neck portion 18 of the external sectional shape indicated in FIG. 11. The device, however, is readily adaptable for use with certain older types of telephone instruments of which many are still in use.

Figure 12:
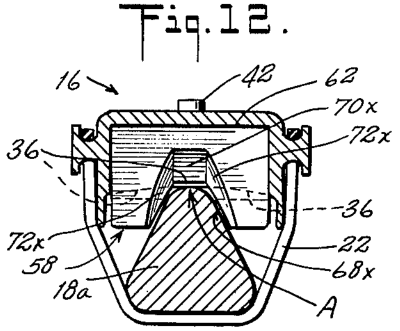
FIG. 12 is a view similar in general character to FIG. 11, but showing the assembled relationship of said mounting element to an older but still used type of telephone instrument.

The neck portion 18*a* of the mentioned older type of telephone instrument is of approximately the external sectional shape indicated in FIG. 12. It will be seen that, if the supporting device, as thus far detailed, is applied to this old style telephone instrument, the only slightly curved free edge 36 of the web 34 will engage the instrument neck 18*a* at a mere point contact at a point indicated at A, thus providing a very unstable mounting for this supporting device. To remedy this condition, an adapter 58 is provided.

The adapter 58 is shown as in the form of a block of suitable material, as, e.g., relatively hard plastic material, shaped as illustrated. This block is symmetrical except for a semi-circular recess 60 formed at the juncture of top surface 62 and inner side surface 64 of the block to provide clearance for the swaged inner end of the pivot pin 14 and for the washer 56 associated with said pin when the adapter is employed as hereinafter explained.

The adapter 58 is formed with a central, vertical slot 66 therein extending from the top surface 62 almost to the bottom of the adapter and extending completely from end-to-end of the adapter. This slot is preferably of such width as to enable the adapter to slide upwardly (as viewed in FIG. 12) upon the camming web 34 with a close, sliding fit.

Figures 13, 14:
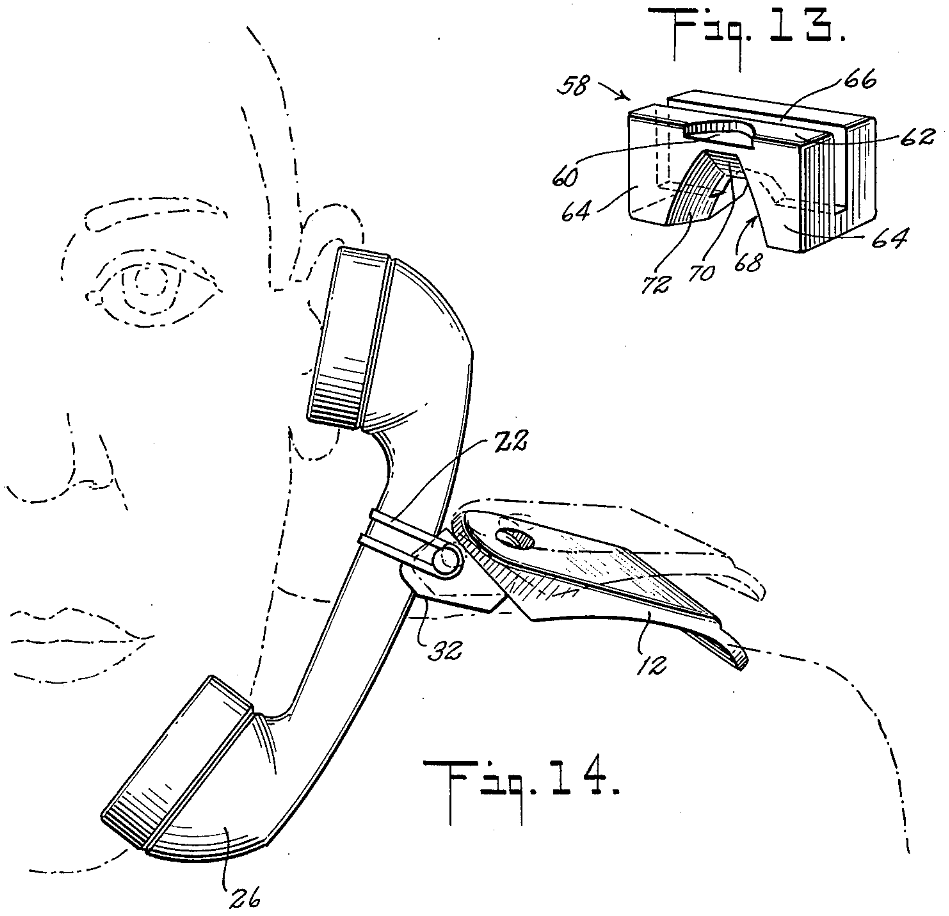
FIG. 13 is a perspective view of an adapter employed in the arrangement of FIG. 12.
FIG. 14 is a side elevational view of a telephone instrument equipped with a supporting device according to this invention; the device being shown in its supporting position and in its relationship, in use, to head and shoulder portions of a user, indicated in broken lines.

The adapter, at its inner side, in view in FIG. 13, and at its outer side, in view in FIG. 12, is formed with substantially similar arch portions 68 and 68*x*. These arch portions, at a central portion of the adapter, are shaped substantially complementally to the adjacent area of the neck 18*a* of the telephone instrument when the supporting device is in dormant position on said instrument corresponding to the position shown in FIG. 1. The arch portions are outwardly flared at their upper ends, as at 70 and 70*x*, and at their opposite sides, as at 72 and 72*x*, these flared portions being so shaped that they will embrace or fit about substantial areas of the telephone instrument's neck 18*a* when the supporting device is in its FIG. 6 position, its FIG. 7 full line position, or its FIG. 7 broken line position (hereinafter explained), thereby maintaining stability of the device on the illustrated old style telephone instrument under all conditions of use. It will be realized that the upright parts of the mentioned arch portions, are in the nature of wings, comparable to wings 32 and having a similar stabilizing function.

As illustrated, the slot 66 extends downwardly to such an extent that it opens into the mentioned arch portions so that the central portion of edge 36 of the web 34 extends slightly into said arch portions to work slidably upon the telephone instrument in the same manner as already explained with reference to the more modern telephone instrument. That arrangement desirably enables the elastic band 22 to operate under the same tension with either of the illustrated types of telephone instruments. The slot 66, however, need not necessarily open into said arches, but need be only deep enough to be slid onto the web 34 and to avoid unduly stretching and increasing the operating tension of the band 22. It is to be understood, of course, that when the adapter is used, the assembled relation of the supporting device and the telephone instrument, held together by the band 22, is such that the adapter cannot become accidentally displaced.

Conditioning of this device for use is a mere momentary operation, involving only the swinging of arm 12 to its first extended position and then to its oblique supporting position. This swinging action may be reversed quickly to restore the device to its dormant condition although it may be left in its supporting condition continuously, if desired, as, in that condition, it does not interfere with the normal operation of the telephone instrument.

Irrespective of which of the two types of telephone instrument with which this device is employed, it possesses the facility of gripping rather than merely resting upon a user's shoulder. Referring to FIG. 14, the user, in utilizing the device, swings the arm 12 to its final or supporting position and then rests it upon his shoulder. Upon initial engagement with the shoulder, the arm 12 may remain in its position shown in full lines in FIGS. 14 and 7; however, the weight of the telephone instrument may suffice to cause the arm 12 to yield upwardly as indicated in broken lines in the two last-mentioned figures, the band 22 stretching somewhat to permit such yielding.

The effect of such yielding is to lift edge 36 of web 34 (FIG. 7) clear of the telephone instrument while the line of force applied by the band 22 to the lugs 24 remains substantially below the back edge 38 of the mounting element. In that situation, the band 22 tends to draw the arm 12 toward the transmitter end of the telephone instrument so that said arm and instrument operate as jaws to grip the user's shoulder therebetween. This gripping effect from the weight of the telephone instrument and the subject supporting device may vary somewhat, depending upon the nature of the material in the user's coat or comparable garment and upon the precise position in which the device is placed upon the user's shoulder. If desired, however, the user may enhance the gripping effect by momentarily pressing the telephone instrument and the supporting device more firmly down upon his shoulder.

It will be seen that utilization of this invention enables one conveniently to make use of a telephone instrument while leaving both hands free for handling papers, writing memoranda, etc.

It should be apparent that the disclosed inventive concepts may be utilized in other ways without, however, departing from the invention as set forth in the following claims.

I claim:

1. A supporting device for a telephone instrument, comprising a mounting element, resilient fastening means for attaching said element yieldably to said instrument, said element having stabilizing means, operative when the element is thus attached, for holding the latter against material angular movement from the principal longitudinal plane of said instrument, an arm element pivoted to said mounting element for pivoting laterally of the latter toward either side of said plane, and pivot-control means for limiting such lateral pivoting and for holding said arm element in any one of plural positions to which it may thus be pivoted; said mounting element being bodily swingable relatively to said instrument in parallelism with said plane and having a camming portion adapted to slide upon an adjacent surface of said instrument during the latter swinging movement and to coact with said instrument and said fastening means to hold said mounting element either in a position corresponding to a dormant position of said arm element or in a position corresponding to a first extended position of said arm element.

2. A supporting device according to claim 1, said camming portion being intermediate of front and back portions of said mounting element and coacting with a back edge of the mounting element and with said resilient fastening means to hold said device yieldably on said instrument in said first extended position and in a final, supporting position; the device when in final supporting position upon a user's shoulder, being yieldable to a shoulder-gripping position in which the device is held in contact with said instrument, by said fastening means, only at said back edge.

3. A supporting device according to claim 1, said fastening means comprising lugs on opposite sides of said mounting element and a resilient band, connectable to said lugs and extensible at least partially about an adjacent part of said instrument.

4. A supporting device according to claim 1, said fastening means comprising lugs on opposite sides of said mounting element and a resilient band, connectable between said lugs and extensible contractively about an adjacent portion of said instrument.

5. A supporting device according to claim 1, said stabilizing means comprising a pair of wings at opposite sides of said mounting element, arranged to extend closely alongside of opposite sides of an adjacent portion of said instrument.

6. A supporting device according to claim 5, inner, opposing faces of said wings being outwardly flared to a shape in which substantial portions thereof conform substantially to curved side surfaces of a portion of a related telephone instrument disposed between said wings, in plural positions to which said mounting element may swing in parallelism with said plane.

7. A supporting device according to claim 5, said wings being flat and parallel to each other to adapt them for close stabilizing engagement with approximately parallel side surfaces of a related telephone instrument, and said camming portion being between and integral with said wings.

8. A supporting device according to claim 7, said camming portion being a web having an edge adapted to slide upon said adjacent surface of said instrument, and said device further including an adapter, slidable onto said web, between said wings, and having arch portions adapted for close stabilizing engagement with substantially curved side surfaces of a related telephone instrument.

9. A supporting device according to claim 8, said adapter being a block formed with a vertical slot extending completely from end-to-end of said block, for receiving said web therewithin, said block being centrally recessed at its bottom to form an arch, inner side surfaces of which are so shaped and spaced as to lie closely adjacent to curved sides of said telephone instrument in plural positions to which said mounting element may be swung in said principal plane of said instrument.

10. A supporting device according to claim 8, said adapter being separable from the remainder of said device to enable use of the latter with different telephone instruments having different shaped surfaces for receiving said device thereon.

11. A supporting device according to claim 1, said camming portion of the mounting element comprising a relatively rigid web having a surface adapted to slide upon an adjacent surface of said instrument into association with the latter at one side of a line of force exerted by said fastening means when the mounting element is at one extreme position to which it is swingable and into association with said instrument at the opposite side of said line of force when the mounting element is at an opposite extreme position to which it is swingable.

12. A supporting device according to claim 11, said stabilizing means comprising a pair of wings at opposite sides of said mounting element, in inter-reenforcing relation to said web, and arranged to extend closely alongside of opposite sides of an adjacent portion of said instrument in any position of the mounting element to which the latter may swing.

13. A supporting device according to claim 1, said pivot-control means including a stud and slot interengagement between said mounting element and said arm element to limit the pivotal movement of the latter relatively to the mounting element.

14. A supporting device according to claim 1, said pivot-control means including detent means on one of said elements and pocket means in the other of said elements, said detent and pocket means coacting to hold said elements in any one of plural angular relationships to which the two may be moved.

15. A supporting device according to claim 1, said pivot-control means including a detent on one of said elements and plural pockets in the other of said elements in position to yieldably receive said detent to hold said arm element yieldably in any one of plural positions to which it may be pivoted relatively to said mounting element.

16. A supporting device according to claim 1, said pivot-control means comprising detent and pocket means and stud and slot means; both said means being operative between said elements to hold said arm element at any one of plural positions to which it may be pivoted relatively to said mounting element and to limit such pivotal movement in opposite directions.

No references cited.